Figure 1:
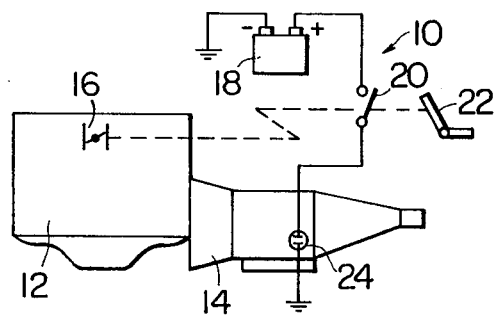

United States Patent [19]
Iijima

[11] 4,134,312
[45] Jan. 16, 1979

[54] CONTROL SYSTEM FOR AN AUTOMATIC POWER TRANSMISSION

[75] Inventor: Tetsuya Iijima, Tokyo, Japan

[73] Assignee: Nissan Motor Company, Limited, Yokohama, Japan

[21] Appl. No.: 753,794

[22] Filed: Dec. 23, 1976

[30] Foreign Application Priority Data

Dec. 27, 1975 [JP] Japan .................. 50-157066

[51] Int. Cl.² .......................................... B60K 41/18
[52] U.S. Cl. ........................................ 74/865; 74/868
[58] Field of Search ............... 74/863, 864, 865, 867, 74/868, 869, 645

[56] References Cited
U.S. PATENT DOCUMENTS

| | | | |
|---|---|---|---|
| 3,546,973 | 12/1970 | Ohie et al. ............................... | 74/868 |
| 3,727,487 | 4/1973 | Forster et al. ...................... | 74/867 X |
| 3,783,713 | 1/1974 | Will .................................. | 74/867 X |
| 3,785,224 | 1/1974 | Will .................................. | 74/867 X |
| 3,859,873 | 1/1975 | Miyauchi et al. ..................... | 74/867 |
| 3,958,466 | 5/1976 | Espenschied .......................... | 74/867 |
| 3,974,720 | 8/1976 | Iijima ................................ | 74/866 |
| 4,020,718 | 5/1977 | Miynuchi et al. ...................... | 74/869 |

*Primary Examiner*—Samuel Scott
*Assistant Examiner*—Lance W. Chandler
*Attorney, Agent, or Firm*—Richard L. Schwaab

[57] ABSTRACT

When the accelerator pedal is fully depressed, shifting points at which the automatic power transmission shifts to another gear ratio are suddenly moved toward the higher vehicle speed to readily achieve the downshift of the transmission even during a relatively high vehicle speed. The downshifts are continued until the magnitude of the throttle pressure which is substantially proportional to the output of the engine is decreased to a predetermined level even when the accelerator pedal is permitted to return to its partially depressed position.

14 Claims, 4 Drawing Figures

CONTROL SYSTEM FOR AN AUTOMATIC POWER TRANSMISSION

The present invention relates in general to a vehicle automatic power transmission system and more particularly to a control system which can allow the transmission to shift down to the next lower vehicle speed gear ratio in an enforced manner by discontinuously moving the shifting points, at which shifting takes place, toward the higher vehicle speed once the accelerator pedal is depressed to its full extent. More particularly, the present invention is concerned with such control system by which the downshift condition is continued for a certain period of time even when the accelerator pedal is permitted to return to its partially depressed position.

Some of the conventional automatic power transmissions are constructed in such a manner that downshift during a relatively high vehicle speed is just completed by continuously fully depressing the accelerator pedal. However, in this conventional construction, the following drawbacks will inevitably arise, which are: Since the downshift is caused by the continuous full depression of the accelerator pedal, it induces wasteful fuel consumption of the engine. Furthermore, if the accelerator pedal is permitted to return to its partially depressed position by accident, upshifting takes place suddenly. This is very undesirable in a rapid acceleration of the vehicle.

Therefore, the present invention proposes to eliminate such drawbacks encountered in the conventional automatic power transmission of a motor vehicle.

It is an object of the present invention to provide a control system of an automatic power transmission by which the transmission readily shifts down to the next lower vehicle speed gear ratio in an enforced manner by discontinuously moving the shifting points toward the higher vehicle speed once the accelerator pedal is fully depressed.

It is another object of the present invention to provide a control system of the transmission for keeping the downshift until the magnitude of the throttle pressure which is substantially proportional to the output of the engine is decreased to a predetermined level even if the accelerator pedal is permitted to return to its partially depressed position.

It is a further object of the present invention to provide a control system for an automatic power transmission of a vehicle driven by an engine the output of which is controlled by the opening degree of the throttle valve operatively connected to the accelerator pedal, the transmission including a downshift circuit into which a hydraulic fluid from a source of fluid under pressure is introducible for readily achieving downshift to the next lower vehicle speed gear ratio, the control system comprising: a kickdown switch connected to the accelerator pedal so as to close when the accelerator pedal is depressed to its full extent; a downshift valve having first and second positions, the first position being a position in which the fluid supply from the source of fluid to the downshift circuit is established, the second position being a position in which the fluid supply from the source of fluid to the downshift circuit is blocked; cancelling passage means for causing the downshift valve to take the second position when a hydraulic fluid under a certain pressure is present therein; an electric actuator for causing, when the kickdown switch is closed, the downshift valve to take the first position, even when the hydraulic fluid under the certain pressure is present in the cancelling passage means; and a position holding valve having first and second positions, the first position inducing a condition in which the hydraulic fluid in the cancelling passage means is drained out when the magnitude of the throttle pressure is above a predetermined level, the second position inducing a condition in which the cancelling passage means is filled with a hydraulic fluid under the certain pressure when the magnitude of the throttle pressure is below the predetermined level.

Figure 2:
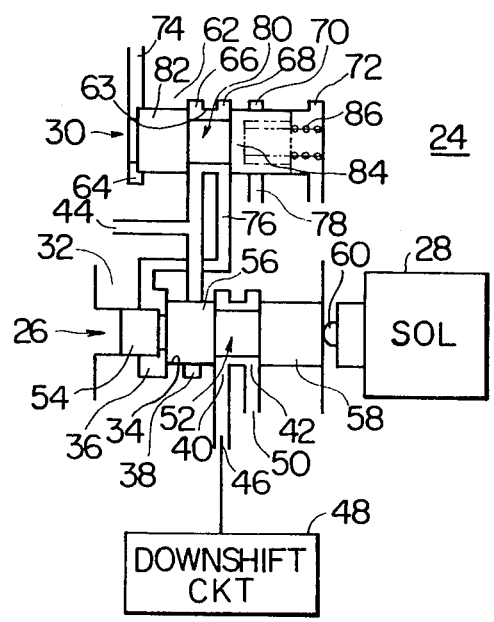
Figure 3:
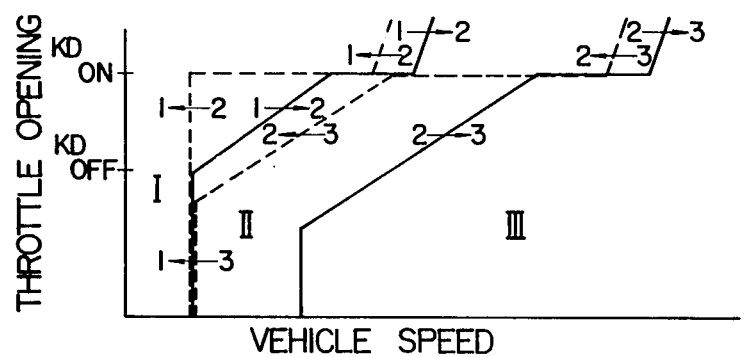
Figure 4:
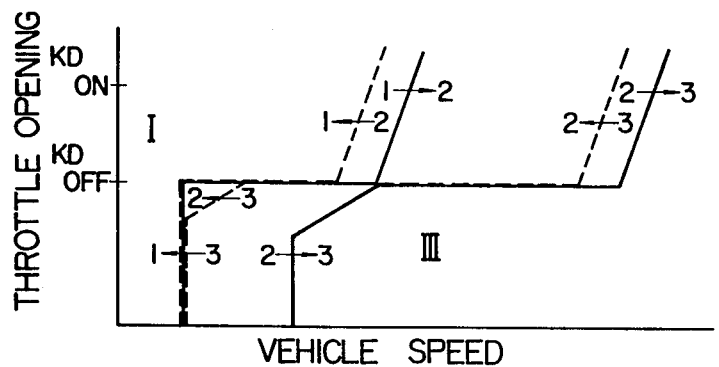

Other objects and advantages of the present invention will become more apparent from the following detailed description when taken in conjunction with the accompanied drawings: in which FIG. 1 is a schematic circuit diagram of a control system connected to an automatic power transmission and an engine, representing the present invention;

FIG. 2 is a schematic sectional view of a downshift valve and a position holding valve employed in the control system of the present invention;

FIG. 3 is an illustration showing downshift and upshift characteristics of the automatic power transmission in a case the position holding operation is not given in the control system of the present invention, showing the vehicle speed and the throttle opening being plotted; and FIG. 4 is an illustration showing downshift and upshift characteristics of the automatic power transmission in a case the position holding operation takes place in the control system.

Referring to FIG. 1 of the drawings, an automatic power transmission control system 10 is shown as communicating with an internal combustion engine 12 and an automatic power transmission proper 14 of known construction. The engine 12 has therein conventional means producing a throttle pressure the magnitude of which is substantially proportional to the output of the engine 12. Usually, the means communicates with a throttle valve 16 so as to produce the throttle pressure the magnitude of which is proportional to the opening degree of the throttle valve 16. Thus, the throttle pressure is at its maximum when the throttle valve is fully open and at its minimum when the valve is only slightly open. The automatic power transmission 14 includes therein a conventional downshift circuit (48) into which a hydraulic fluid from a source of fluid under pressure (not shown) is introducible to discontinuously move shifting points at which the transmission shifts to other vehicle speed gear ratios toward the higher vehicle speed.

The control system 10 generally comprises a D.C. source 18, a kickdown switch 20 synchronously operated by an accelerator pedal 22, and a valve assembly 24 connected to the transmission 14, the detailed construction of the valve assembly 24 being shown in FIG. 2. The kickdown switch 20 is disposed between the D.C. source 18 and the valve assembly 24 and closes causing the energization of a later mentioned electric actuator (28) of the valve assembly 24 when the accelerator pedal 22 is fully depressed to fully open the throttle valve 16 of the engine 12.

As shown in FIG. 2, the valve assembly 24 generally comprises a downshift valve 26, the solenoid actuator 28, and a position holding valve 30.

The downshift valve 26 comprises a valve body 32 formed with a chamber 34 including a first annular recess 36, a second annular recess 38, a third annular recess 40 and a fourth annular recess 42. The first annular recess 36 is fluidly communicable through the position holding valve 30 to a line pressure passage 44 into which a hydraulic fluid from a source of fluid under pressure is fed. The second annular recess 38 communicates with the line pressure passage 44. The third annular recess 40 fluidly communicates through a downshift passage 46 to the before-mentioned downshift circuit 48 of the transmission 14. The downshift circuit 48 may include a 1-2 shift valve and a 2-3 shift valve which are operatively mounted on the transmission 14 in a conventional manner. The fourth annular recess 42 communicates with a fluid reservoir tank (not shown) through a drain passage 50.

Axially slidably received in the chamber 34 of the valve body 32 is a valve spool 52 which has spaced left, middle and right lands 54, 56 and 58. (It should be noted that the middle and right lands 56 and 58 are designated as first and second lands in the appended claims.) As shown, the middle and right lands 56 and 58 have an identical diameter, while the left land 54 has a smaller diameter than the lands 56 and 58. The valve spool 52 is slidable in the chamber 34 between first and second positions. The first position is a position in which the middle land 56 opens the fluid communication between the second and third annular recesses 38 and 40 and simultaneously the right land 58 blocks the fluid communication between the third and fourth annular recesses 40 and 42. Thus, in this first position of the valve spool 52, a hydraulic fluid from the line pressure passage 44 is introduced into the downshift passage 46 of the downshift circuit 48 to set the shifting points at the higher vehicle speed. The second position is a position in which, as shown in the drawing, the middle land 56 blocks the fluid communication between the second and third annular recesses 38 and 40 and simultaneously the right land 58 opens the fluid communication between the third and fourth annular recesses 40 and 42. Thus, in this second position of the valve spool 52, the fluid supply toward the downshift circuit 48 is blocked and simultaneously the remaining fluid in the downshift passage 46 is drained through the drain passage 50, thereby returning back the shifting points to their previously set positions. It is to be noted that the first and second annular recesses 36 and 38 are always isolated by the second land 56.

Adjacent the downshift valve 26 is located the electric actuator 28 which comprises a solenoid coil (not shown) having one end connected to the above-mentioned kickdown switch 20 and the other end grounded, and a slidable plunger 60 which is reciprocally movable in the solenoid coil 28. The plunger 60 is arranged to project leftward of this drawing toward the right land 58 to push the valve spool 52 into the before-mentioned first position when the solenoid coil is electrically energized in response to closing of the kickdown switch 20. Now, it should be noted that the sliding movement of the valve spool 52 in the chamber 34 is so made to generate a certain frictional force between cylindrical outer surface of the valve spool 52 and the cylindrical surface of the chamber 34, so that once the valve spool 52 shifts to the first position and the plunger 60 returns to its home position due to the de-energization of the solenoid coil, it remains in this first position until sufficient pressure is present in the first annular recess 36 to overcome the frictional force.

The position holding valve 30 comprises a valve body 62 formed with a chamber 63 including a first annular recess 64, a second annular recess 66, a third annular recess 68, a fourth annular recess 70 and a fifth annular recess 72. The first annular recess 64 fluidly communicates with a throttle pressure passage 74 into which the before-mentioned throttle pressure of the engine 12 is applied. The second annular recess 66 is fluidly connected to both the line pressure passage 44 and the second annular recess 38 of the downshift valve 26, as shown. The third annular recess 68 is connected through a so-called cancelling passage 76 to the first annular recess 36 of the downshift valve 26. The fourth annular recess 70 communicates with a fluid reservoir tank (not shown) through a drain passage 78. The fifth annular recess 72 communicates with the open air.

Axially slidably received in the chamber 63 of the valve body 62 is a valve spool 80 which has spaced first and second lands 82 and 84 with an identical diameter. The valve spool 80 is urged leftward of the drawing by the force of a spring 86 which is disposed in the fifth annular recess 72. If desired, the second annular land 84 may be formed with a blind bore for secure setting of the spring 86. The valve spool 80 is slidable in the chamber 63 between first and second positions in accordance with the magnitude of the throttle pressure applied to first annular recess 64 from the engine 12. The first position is a position in which the first land 82 blocks the fluid communication between the second and third annular recesses 66 and 68 and simultaneously the second land 84 opens the fluid communication between the third and fourth annular recesses 68 and 70. The first position takes place when the magnitude of the throttle pressure is above a predetermined level overcoming the urging force of the spring 86. Thus, in the first position of the valve spool 80, the hydraulic fluid in the first annular recess 36 of the downshift valve 26 is drained through the drain passage 78. The second position is a position in which, as shown in the drawing, the first land 82 opens the fluid communication between the second and third annular recesses 66 and 68 and simultaneously the second land 84 blocks the fluid communication the third and fourth annular recesses 68 and 70. In the second position of the valve spool 80, the hydraulic fluid from the line pressure passage 44 is introduced through the cancelling passage 76 into the first annular recess 36 of the downshift valve 26.

With the above-stated construction of the control system 10 of the present invention, the operation is as follows:

When the vehicle driver wishes to downshift the transmission 14, he strongly depresses the accelerator pedal 22 to its full extent to close the kickdown switch 20. With closing of the kickdown switch 20, the solenoid coil of the electric actuator 28 is energized thus causing the plunger 60 to project leftward to push the valve spool 52 into the first position. Thus, the fluid connection between the line pressure passage 44 and the downshift passage 46 is completed to energize the downshift circuit 48. Now, in this condition, the magnitude of the throttle pressure is sufficiently high, so that the valve spool 80 of the position holding valve 30 takes the first position thereby blocking the communication between the first annular recess 36 of the downshift valve 26 and the line pressure passage 44 and simultaneously providing the communication between the first annular recess 36 and the drain passage 78. Accordingly, the valve spool 52 of the downshift valve 26 can remain in the first position even if the kickdown switch 20 opens in response to the releasing of the accelerator pedal 22 from its fully depressed position. As a result, the shifting points remain at the higher vehicle speed side. Thus, downshift of the transmission 14 is quickly or readily achievable even during a relatively high vehicle speed.

After the downshift of the transmission 14, when the magnitude of the throttle pressure is decreased and finally lowered to the predetermined level in response to the drop down of the output of the engine 12, the valve spool 80 moves into the second position by the action of the spring 86 thereby providing the fluid communication between the first annular recess 36 of the downshift valve 26 and the line pressure passage 44 and simultaneously blocking the fluid communication between the first annular recess 36 and the drain passage 78 of the position holding valve 30. Accordingly, the valve spool 52 of the downshift valve 26 takes its second position, as shown in the drawing, to cut the fluid supply from the line pressure passage 44 to the downshift circuit 48 and simultaneously drain out the remaining fluid in the downshift circuit 48 through the drain passage 50. With these procedures, the shifting points return to the previously set positions.

FIG. 3 shows upshift and downshift characteristics of the transmission 14 in case the position holding operation is not given in the control system 10 of the invention. First, second and third gear ratios of the transmission 14 are respectively represented by the letters I, II and III. The solid lines represent respective shifting points in case of upshifts, while the broken lines represent the shifting points in case of downshifts. The zone positioned above a point designated by KD-ON is a zone within which the kickdown switch closes thus causing the valve spool 52 of the downshift valve 26 to take the before-mentioned first position. Within this zone, the shifting points of the transmission 14 take place at a higher vehicle speed.

FIG. 4 shows the upshift and downshift characteristics of the transmission 14 in case the position holding operation takes place in the control system 10. The zone located between the point KD-ON and the point KD-OFF is a zone within which the kickdown switch 20 is opened and simultaneously the magnitude of the throttle pressure is higher than the predetermined level thus causing the valve spool 52 of the downshift valve 26 to still remain in the first position. Accordingly, within this zone, the shifting points are still set at a higher vehicle speed.

With the above-stated construction of the control system of the present invention, the following several advantages and effects will be achieved.

(1) Since downshifting can be continued even when the kickdown switch is opened, the vehicle driver can accelerate the vehicle more sportily or easily by adjusting the depression of the accelerator pedal.

(2) Since downshifting is continuously achieved even when the accelerator pedal is not fully depressed, the acceleration of the vehicle in the lower vehicle speed gear ratio can be done with a small fuel consumption.

(3) Since upshifting of the transmission takes place in case the throttle valve relatively widely opens causing the predetermined magnitude of the throttle pressure, the slight movement of the accelerator pedal from its fully depressed position does not induce the unwanted sudden upshifting of the transmission.

(4) Since the control system of the subject invention can be constructed only by partially changing part of a conventional one, it can be made in a relatively economical manner.

It should be noted that the foregoing description shows only an exemplary embodiment. Various modifications are apparent to those skilled in the art without departing from the scope of the present invention which is only limited by the appended Claims.

What is claimed is:

1. A control system for an automatic power transmission of a vehicle driven by an engine the output of which is controlled by the degree of opening of a throttle valve operatively connected to an accelerator pedal, said transmission including a downshift circuit into which hydraulic fluid from a source of fluid under pressure is introducible for downshifting the transmission to the next lower vehicle speed gear ratio, said control system comprising:

a kickdown switch connected to said accelerator pedal in such a manner that said switch is actuated when said accelerator pedal is fully depressed;

a downshift valve having first and second positions, said first position being a position in which fluid communication is established between said source of fluid and said downshift circuit, said second position being a position in which fluid communication between said source of fluid and said downshift circuit is blocked;

cancelling passage means for causing said downshift valve to assume said second position when a hydraulic fluid under a certain pressure is present therein;

an electric actuator actuated by the closing of said kickdown switch, which causes said downshift valve to assume said first position, even when hydraulic fluid under said certain pressure is present in said cancelling passage means; and a position holding valve which is in contact with a source of throttle pressure, and in response to changes in the magnitude thereof assumes a first position when said throttle pressure is above a predetermined level which blocks fluid flow in said cancelling passage means and which thereby holds said downshift valve in its first position wherein fluid flow between said source of fluid and said downshift circuit is opened, and a second position when said throttle pressure is below a predetermined level which opens fluid flow in said cancelling passage means and which thereby urges said downshift valve into its second position wherein fluid flow between said source of fluid and said downshift circuit is blocked.

2. A control system as claimed in claim 1, in which said downshift valve comprises:

a valve body formed with a chamber including first, second, third and fourth annular recesses which respectively and fluidly communicate with either of a drain passage and said source of fluid through said position holding valve, said source of fluid, said downshift circuit of said transmission and a drain passage; and a valve spool axially slidably received in said chamber of said valve body and having thereon spaced first and second lands, said valve spool being slidable between first and second positions in said chamber, said first position being a position in which said first land opens fluid communication between said second and third annular recesses and simultaneously said second land blocks fluid communication between said third and fourth annular recesses, said second position being a position in which said first land blocks fluid communication between said second and third annular recesses and simultaneously said second land opens fluid communication between said third and fourth annular recesses.

3. A control system as claimed in claim 2, in which said first annular recess of said downshift valve comprises said cancelling passage means.

4. A control system as claimed in claim 3, in which said electric actuator comprises:
   a solenoid coil electrically connected through said kickdown switch to an electrical power source which is energized when said kickdown switch closes; and
   a plunger operable by said solenoid coil to push said valve spool of said downshift valve into said first position when said solenoid coil is energized in response to closing of said kickdown switch.

5. A control system as claimed in claim 4, in which the valve spool remains in said first position even when said solenoid coil is deenergized so long as said first annular recess of said valve body fluidly communicates with said drain passage through said position holding valve.

6. A control system as claimed in claim 5, in which said position holding valve comprises:
   a valve body having a chamber including first, second, third, fourth and fifth annular recesses which respectively and fluidly communicate with a throttle pressure passage into which said throttle pressure is applied, said source of fluid, said first annular recess of said downshift valve, a drain passage and the open air; and
   a valve spool axially slidably received in the chamber of said valve body and having spaced first and second lands with an identical diameter, said valve spool being slidable between first and second positions, said first position being a position in which said first land blocks the fluid communication between said second and third annular recesses and simultaneously said second land opens the fluid communication between said third and fourth annular recesses, said second position being a position in which said first land opens the fluid communication between said second and third annular recesses and simultaneously said second land blocks the fluid communication between said third and fourth annular recesses, said first position being established when the magnitude of the throttle pressure is above said predetermined level, said second position being established when said magnitude is below said predetermined level.

7. A control system as claimed in claim 6, further comprising a spring which is disposed in said fifth annular recess of said valve body for biasing said valve spool to take said second position.

8. A control system for an automatic power transmission of a vehicle driven by an engine the output of which is controlled by the degree of opening of a throttle valve operatively connected to an accelerator pedal, said transmission including a downshift circuit into which a hydraulic fluid from a source of fluid under pressure is introducible for readily achieving downshifting of the transmission into a lower vehicle speed gear ratio, said control system comprising:

a kickdown switch connected to said accelerator pedal in such a manner that said switch is actuated when said accelerator pedal is fully depressed;
a downshift valve having first and second positions, said first position being a position in which fluid communication is established between said source of fluid and said downshift circuit, and said second position being a position in which fluid communication between said source of fluid and said downshift circuit is blocked;
cancelling passage means for causing said downshift valve to assume its second position when hydraulic fluid under a certain pressure is present therein;
an electric actuator, energized by the closing of said kickdown switch, which causes said downshift valve to assume its first position, even when hydraulic fluid under said certain pressure is present in said cancelling passage means; and
a position holding valve comprising a valve body having a chamber including first, second, third, fourth, and fifth annular recesses which respectively and fluidly communicate with a source of throttle pressure, said source of hydraulic fluid, said first annular recess of said downshift valve, a drain passage, and ambient air; and a valve spool axially slidably movable within said chamber in response to changes in throttle pressure magnitude in said first annular recess, and having spaced first and second lands with an identical diameter, said valve spool being slidable between first and second positions, said first position being a position in which said first land blocks fluid communication between said second and third annular recesses and simultaneously said second land opens fluid communication between said third and fourth annular recesses, said second position being a position in which said first land opens fluid communication between said second and third annular recesses and simultaneously said second land blocks fluid communication between said third and fourth annular recesses, said first position being assumed when said throttle pressure magnitude is above a predetermined level, said second position being assumed when said throttle pressure magnitude is below said predetermined level.

9. A control system as claimed in claim 8, in which said downshift valve comprises:
   a valve body formed with a chamber including first, second, third, and fourth annular recesses which respectively and fluidly communicate with either of a drain passage and said source of fluid through said position holding valve, said source of fluid, said downshift circuit of said transmission, and a drain passage; and
   a valve spool axially slidably received in said chamber of said valve body and having thereon spaced first and second lands, said valve spool being slidable between first and second positions in said chamber, said first position being a position in which said first land opens fluid communication between said second and third annular recesses and simultaneously said second land blocks fluid communication between said third and fourth annular recesses, said second position being a position in which said first land blocks fluid communication between said second and third annular recesses and simultaneously said second land opens fluid communication between said third and fourth annular recesses.

10. The control system of claim 9 wherein said first annular recess of said downshift valve comprises said cancelling passage means.

11. The control system of claim 8 wherein said electric actuator comprises:
a solenoid coil electrically connected through said kickdown switch to an electrical power source to be energized when said kickdown switch closes; and a plunger operable by said solenoid coil to push said valve spool of said downshift valve into said first position when said solenoid coil is energized in response to closing of said kickdown switch.

12. The control system of claim 8, further comprising a spring which is disposed in said fifth annular recess of said position holding valve body for biasing said valve spool into its second position.

13. A control system for an automatic power transmission of a vehicle driven by an engine the output of which is controlled by the degree of opening of a throttle valve operatively connected to an accelerator pedal, said transmission including a downshift circuit into which hydraulic fluid from a source of fluid under pressure is introducible for readily achieving downshifting of the transmission to the next lower vehicle speed gear ratio, said control system comprising:
a kickdown switch connected to said accelerator pedal in such a manner that said switch is actuated when said accelerator pedal is fully depressed;
a downshift valve having first and second positions, said first position being a position in which fluid communication is established between said source of fluid and said downshift circuit said second position being a position in which fluid communication between said source of fluid and said downshift circuit is blocked;
cancelling passage means for causing said downshift valve to assume said second position when hydraulic fluid under a certain pressure is present therein;
an electric actuator, energized by the closing of said kickdown switch, which causes, said downshift valve to assume said first position, even when hydraulic fluid under said certain pressure is present in said cancelling passage means;
a position holding valve which is in contact with a source of throttle pressure, and in response to changes in the magnitude thereof, assumes first and second positions, said first position inducing a condition in which said hydraulic fluid in said cancelling passage means is drained out when the magnitude of said throttle pressure is above a predetermined level, said second position inducing a condition in which said cancelling passage means is filled with hydraulic fluid under said certain pressure when the magnitude of said throttle pressure is below the predetermined level;
said downshift valve comprising a valve body formed with a chamber including first, second, third, and fourth annular recesses which respectively and fluidly communicate with either of a drain passage and said source of fluid through said position holding valve, said source of fluid, said downshift circuit of said transmission, and a drain passage; and a valve spool axially slidably received in said chamber of said valve body and having thereon spaced first and second lands, said valve spool being slidable between first and second positions in said chamber, said first position being a position in which said first land opens fluid communication between said second and third annular recesses and simultaneously said second land blocks fluid communication between said third and fourth annular recesses, said second position being a position in which said first land blocks the fluid communication between said second and third annular recesses and simultaneously said second land opens fluid communication between said third and fourth annular recesses, said first annular recess of said downshift valve comprising said cancelling passage means;

said electric actuator comprising a solenoid coil electrically connected through said kickdown switch to an electrical power source which is energized when said kickdown switch sloses; and a plunger operable by said solenoid coil to push said valve spool of said downshift valve into said first position when said solenoid coil is energized in response to closing of said kickdown switch, said valve spool of said downshift valve remaining in said first position even when said solenoid coil is deenergized so long as said first annular recess of said valve body of said downshift valve fluidly communicates with said drain passage through said position holding valve; and said position holding valve comprising a valve body having a chamber including first, second, third, fourth and fifth annular recesses which respectively and fluidly communicate with a source of throttle pressure said source of hydraulic fluid, said first annular recess of said downshift valve, a drain passage, and ambient air; and a valve spool axially slidably movable within said chamber of said position holding valve body in response to changes in throttle pressure magnitude in said first annular recess and having spaced first and second lands with an identical diameter, said valve spool being slidable between first and second positions, said first position being a position in which said first land blocks fluid communication between said second and third annular recesses and simultaneously said second land opens fluid communication between said third and fourth annular recesses, said second position being a position in which said first land opens fluid communication between said second and third annular recesses and simultaneously said second land blocks fluid communication between said third and fourth annular recesses, said first position being established when the magnitude of the throttle pressure is above said predetermined level, said second position being established when the magnitude is below said predetermined level.

14. A control system as claimed in claim 13, further comprising a spring which is disposed in said fifth annular recess of said valve body of said position holding valve for biasing said valve spool to take said second position.

* * * * *